United States Patent
Forgione (12)

(10) Patent No.: US 8,794,494 B2
(45) Date of Patent: Aug. 5, 2014

(54) TRUNK STORAGE DEVICE

(76) Inventor: Paul Forgione, Wakefield, MA (US)

(*) Notice: Subject to any disclaimer, the term of this patent is extended or adjusted under 35 U.S.C. 154(b) by 151 days.

(21) Appl. No.: 13/482,479

(22) Filed: May 29, 2012

(65) Prior Publication Data

US 2013/0320690 A1 Dec. 5, 2013

(51) Int. Cl.
*B60R 7/00* (2006.01)

(52) U.S. Cl.
USPC .......................................................... 224/539

(58) Field of Classification Search
USPC .................. 224/539, 543, 544, 545, 547, 275
See application file for complete search history.

(56) References Cited

U.S. PATENT DOCUMENTS

| | | | |
|---|---|---|---|
| 2,748,516 A | 6/1956 | McClusky | |
| 4,190,148 A * | 2/1980 | Schade et al. | 206/89 |
| 4,754,883 A | 7/1988 | Grzywa | |
| 4,838,745 A | 6/1989 | Haydock | |
| 4,901,961 A | 2/1990 | Gish | |
| 5,607,067 A | 3/1997 | Morrissey | |
| 5,695,162 A | 12/1997 | DiCastro | |
| 6,244,285 B1 | 6/2001 | Gamache | |
| 6,443,346 B1 | 9/2002 | Haass | |
| 6,561,353 B2 * | 5/2003 | Levieux et al. | 206/423 |

FOREIGN PATENT DOCUMENTS

JP    08207637 A  *  8/1996  ............... B60N 3/08

* cited by examiner

*Primary Examiner* — Adam Waggenspack
(74) *Attorney, Agent, or Firm* — Lambert & Associates; Gary E. Lambert; David J. Connaughton, Jr.

(57) ABSTRACT

A trunk storage device is provided. The trunk storage device may have a base constructed to be substantially planar, a storage unit attached to an edge of the base, and a connection portion connecting the storage unit to the base. The connection portion may provide a spacing between the base and the storage unit to allow passage of a mat positioned at a bottom of a vehicle trunk.

10 Claims, 4 Drawing Sheets

TRUNK STORAGE DEVICE

BACKGROUND OF THE INVENTION

1. Field of the Invention

The present invention relates generally to storage devices for a trunk of a vehicle. More particularly, the present invention relates to a trunk storage device that is secured under a mat in a vehicle trunk.

2. Description of Related Art

A vehicle trunk provides a cavity in which to store a number of items of varying size. However, in some cases, the trunk is substantially larger than the contents stored therein. As such, during acceleration, cornering, and braking, small objects, particularly round objects may roll and tumble about within the trunk. This rolling and tumbling may cause irritating and upsetting noises, and further may cause damage to the objects as well as the vehicle.

Unfortunately, there has been no effective trunk storage device available to the automobile owner. Instead, such items as oil and windshield washer fluid are often simply placed loosely in the trunk where they can roll about making considerable noise and can even spill causing undesirable staining of trunk carpeting and/or other items carried in the trunk. Of course, the same holds true for transmission fluid, brake fluid and coolant.

Therefore, what is needed is a device that may conveniently and effectively provide a storage area for items within the trunk, to retain and organize these items.

SUMMARY OF THE INVENTION

The subject matter of this application may involve, in some cases, interrelated products, alternative solutions to a particular problem, and/or a plurality of different uses of a single system or article.

In one aspect, a storage device is provided. The storage device may comprise a substantially planar base and a storage unit attached to the base. The storage unit may be attached to the base by a connection portion of the base, the base being sized and configured to provide support for the storage unit. Further, the connection portion may form a spacing between the storage unit and the base when connected. This spacing may be sized to allow passage of a mat of a vehicle trunk, such that the storage device is secured by the mat.

In another aspect, an automotive vehicle having a trunk storage device is provided. The vehicle may comprise a trunk, and a trunk storage device secured within the trunk. The trunk storage device being constructed and arranged to secure an item substantially smaller than the trunk itself. The trunk storage device may comprise a base, the base being positioned under a mat of the vehicle trunk. The trunk storage device may further comprise a storage unit, the storage unit attached to the base by a connection portion, and positioned above the mat of the trunk. The connection portion may separate the base and the storage unit, creating a spacing between the two. The trunk mat is positioned in this spacing between the base and the storage unit.

In yet another aspect, a method of installing a storage device into a trunk of a vehicle is provided. The method comprises the steps of: lifting a part of a mat from a bottom of the vehicle trunk, and sliding a planar base of the storage device between the mat and the bottom of the trunk. Further, the method comprises the steps of positioning a storage unit of the storage device over the mat, the storage unit connected to the base by a connection portion. Finally the method comprises placing the part of the mat into a spacing formed by the connection portion between the base and the storage unit.

DETAILED DESCRIPTION

Figure 1:
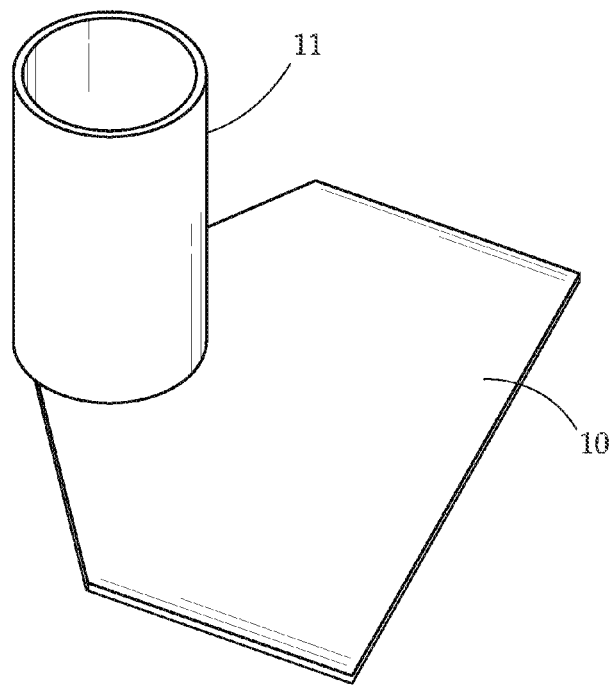
FIG. 1 provides a perspective view of the storage device.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a trunk storage device. The trunk storage device may have a base constructed to be substantially planar, a storage unit attached to an edge of the base, and a connection portion connecting the storage unit to the base. The connection portion may provide a spacing between the base and the storage unit to allow passage of a mat of a vehicle trunk. In operation, the base may be positioned below the mat, while the storage unit may be positioned above the mat, allowing access to the storage unit from the trunk interior.

Typically, a trunk of a vehicle is provided with a mat at its bottom to separate the sheet metal of the vehicle at a bottom of the trunk from an interior of the trunk. This both protects the metal of the vehicle, as well as the items stored within the trunk. The mat of the trunk generally is shaped to cover the entirety of the base of the trunk, fitting snugly within the trunk. This mat may be lifted up partially, allowing the base of the storage device to be placed under the mat.

In one embodiment, the base may be formed as a substantially planar sheet. The base may have any shape that allows it to support the storage unit and remain substantially stationary when secured under the mat of the trunk.

In another embodiment, the base may be formed as a substantially planar wire or tubular shaped material, configured to form a perimeter of the base. The wire may have any shape and form any perimeter that allows it to support the storage unit and remain substantially stationary when secured under the mat of the trunk.

The base may be constructed of any material substantially rigid enough to support a storage unit against forces experienced during driving. Such forces may include acceleration, cornering, braking and/or crashing. Examples of materials of which the base may be made include plastics, metals, composite materials, wood, particle board, or ceramics, among others.

The base may be formed in any shape and size having a width and length capable of providing support to the storage unit. Shapes of the base may include, but are not limited to, a square, rectangle, triangle, pentagon, circle or oval. In a further embodiment, the base may have a shape substantially corresponding to a contour of a trunk wall. In another embodiment, the base may be custom shaped depending on a particular vehicle model's trunk shape. In a particular embodiment, the base may have a cross sectional footprint that is at least two times greater than a cross sectional footprint area of the storage unit.

A storage unit may be attached to the base. In one embodiment, the storage unit may be permanently attached to the base. In another embodiment, the storage unit may be removably attached from the base. In still another embodiment, the storage unit may be integrally formed with the base, and connected by a connection portion extending from the base to the storage unit. In yet another embodiment, the base may form a protrusion receivable by a detent of the storage unit. The storage unit may be removably attached to the base by placement of the protrusion of the base in the detent of the storage unit.

In embodiments wherein the storage unit is removably attached from the base, the storage unit may be attached to the base in any removable manner. For example, attachment structures connecting the storage unit to the base may include a snap fit, threaded attachment, a pressure fit, and a male-female prong configuration allowing the storage unit to remain in place, among others.

The storage unit may be of any shape and size that may provide convenient storage and/or organization of small items stored within a vehicle trunk. Generally, the storage unit may comprise a bounding sidewall or sidewalls that create a storage area. The sidewall may form a continuous surface, or may be non-continuous. Optionally, the storage unit may comprise a bottom surface, and a cover.

In one embodiment, the storage unit may be formed by a sidewall or sidewalls forming a substantially cylindrical storage unit. In a further embodiment, a cylindrical storage unit may be sized to form a storage area to receive a standard sized 1 gallon windshield washer fluid container. In this embodiment, the washer fluid container may be secured within the storage area. The round shape of the washer fluid container, along with its weight and spillable contents, makes it prone to rolling, crashing, and potentially spilling in a trunk during driving conditions. As such, washer fluid containers are a prime candidate for storage within the storage unit.

In another embodiment, the storage unit may be formed by a sidewall or sidewalls forming a substantially box shaped storage unit. In this embodiment, various items may be stored within the rectangular storage area. For example, the storage unit may be sized to receive gas tanks with a rectangular cross section that may fit snugly within the storage unit. Further, in another embodiment, a plurality of small tools and other items may be stored within the storage area.

In still another embodiment, one or a plurality of dividers may be positioned within the storage unit. The dividers may serve to break the internal storage area into a plurality of smaller storage areas, to aid in organization of placement and storage of small items.

The storage unit may be constructed of any material rigid and durable enough to hold varying items against the forces experienced during the driving of a motor vehicle. Examples of materials of which the storage unit may be made include plastics, metals, composite materials, wood, particle board, or ceramics, among others.

In another embodiment, the base may have a plurality of connection portions, allowing for attachment of a plurality of storage units to the base. In this embodiment, multiple storage units may be utilized to store different items, and may be attached to a single base. In a further embodiment, a plurality of storage units may be removably mountable to the base, and may be interchanged depending on what the user desires to store in the storage device. For example, if a gas tank and windshield washer fluid container are to be stored, storage units designed for such storage may be attached to the base, and the tank and container may be stored in their appropriate storage units.

In still a further embodiment, a plurality of trunk storage devices may be mounted within a single trunk, the base of each storage device positioned under the trunk mat, and the storage unit of each storage device positioned over the mat.

It is important to note that the connection portion of the base forms a spacing between the base and the storage unit when attached. This spacing is sized to allow passage of at least a mat of the trunk. This configuration allows the base to be positioned under the mat, securing the storage device, while the storage unit is positioned over the mat.

In one embodiment of use, the storage device may be installed by a user lifting up a mat of a vehicle's trunk, and sliding the base of the storage device under the mat. The mat may then be returned to its original, resting position by being slid between a spacing between the base and storage unit. Once the mat is returned to its original position, the storage device will be in a secured operating position, and various items may be placed securely within the storage unit.

The storage device may be manufactured in any manner to allow efficient construction of the device. In one embodiment, the storage unit may be formed from a single sheet of plastic material. In this embodiment, a flat rectangular sheet of plastic may be cut in two places on opposite sides of the sheet, the cuts being approximately $1/5$-$1/3$ of the width of the sheet. Next, the cut sides may be folded inwardly to either connect, or nearly connect, thereby forming the storage area. The uncut region of the plastic sheet may then be folded upward such that its sides are approximately perpendicular to the remainder of the sheet. In this embodiment, the cuts may be of a moderate width, such that the uncut region forms a spacing when folded upward. Once this folding is completed, the plastic sheet may be processed to retain its shape.

Turning now to FIG. 1 a perspective view of the storage device is shown. This figure shows an embodiment where the storage unit 11 is in a cylindrical shape with a substantially circular cross section. The storage unit 11 is attached to an edge of the base 10. The base 10 is formed as a continuous sheet, and is sized to slide under a mat of a vehicle trunk.

Figure 2:
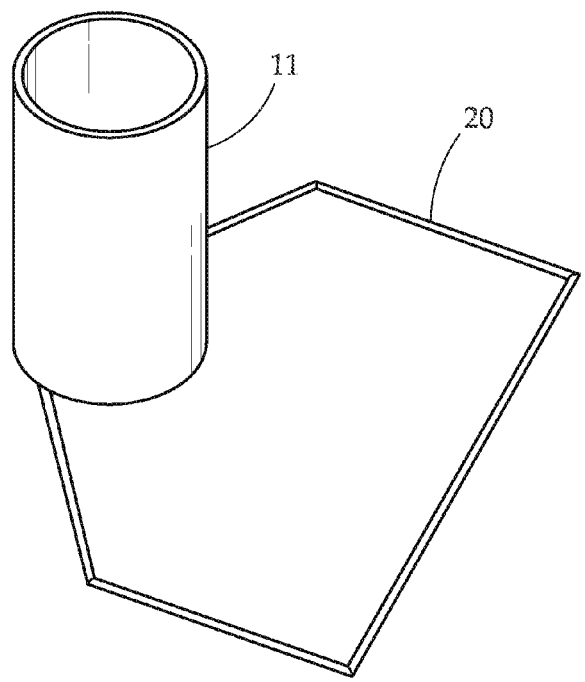
FIG. 2 provides a perspective view of another embodiment of the storage device.

FIG. 2 shows a perspective view of another embodiment of the storage device. In this embodiment, the base 20 is formed as a wire frame. The storage unit 11 is shown here as having a cylindrical shape with a substantially circular cross section. The storage unit 11 is attached to an edge of the base 20 via a connection portion (not shown).

Figure 3:
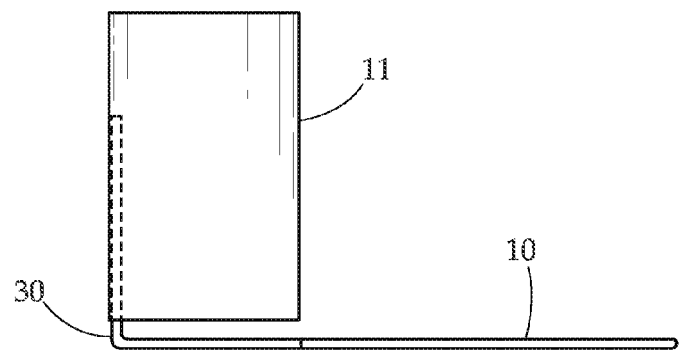
FIG. 3 provides a side view of an embodiment of the storage device.

FIG. 3 provides a side view of an embodiment of the storage device. The base 10 is substantially flat and fairly narrow. A connection portion 30 of the base extends upwards and connects to the storage unit 11. The connection portion 30 provides a spacing between the storage unit 11 and the base 10 through which a mat of a vehicle may pass.

Figure 4:
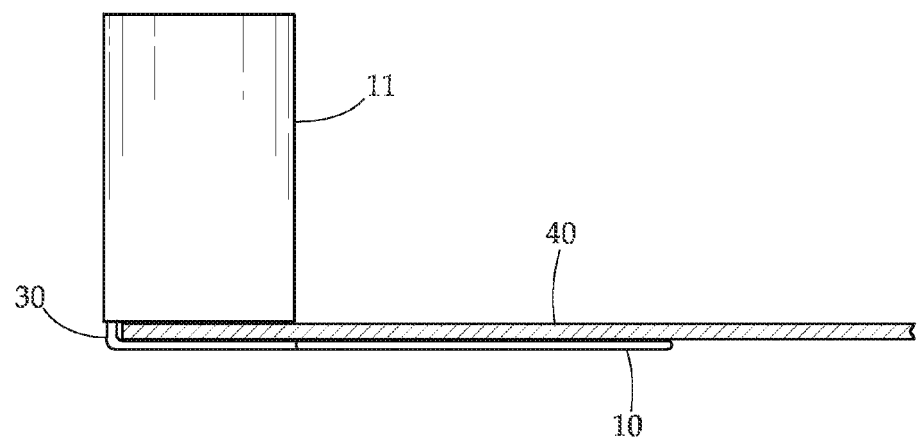
FIG. 4 provides a side view of another embodiment of the storage device.

FIG. 4 provides a side view of another embodiment of the storage device. The base 10 is substantially flat and fairly narrow. A connection portion 30 of the base extends upwards and connects to the storage unit 11. The connection portion 30 provides a spacing between the storage unit 11 and the base 10 through which a mat 40 of a vehicle may pass. The base 10 can be seen positioned below the mat 40 and secured thereby. The storage unit 11 is positioned above the mat 40, providing access from the trunk interior.

Figure 5:
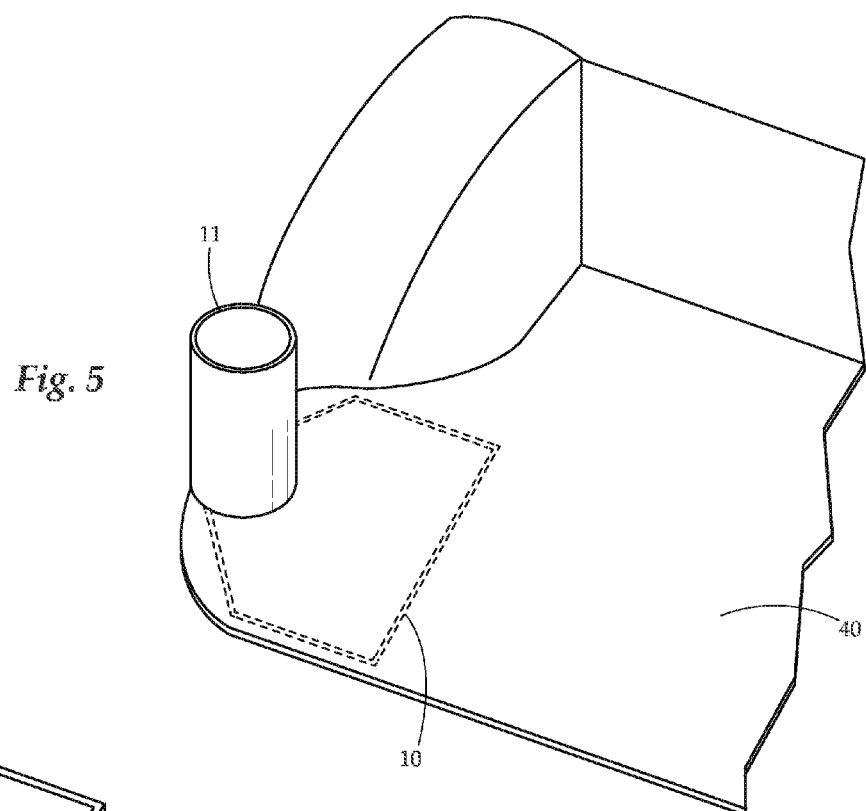
FIG. 5 provides an elevation view of the storage device mounted in a vehicle trunk.

FIG. 5 provides an elevation view of an embodiment of the storage device mounted within a vehicle trunk. The base 10 is positioned under the trunk mat 40, and secured by the mat 40. A storage unit 11 is connected to the base by a connection portion (not shown) and is positioned over the mat 40 allowing storage of components therein.

Figure 6:
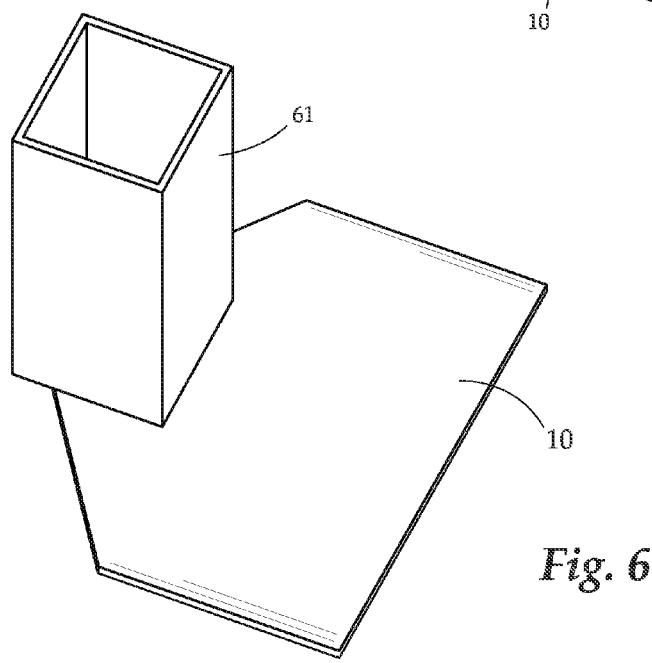
FIG. 6 provides a perspective view of an embodiment of the storage device.

FIG. 6 provides an embodiment of a perspective view of the storage device. This figure shows an embodiment where the storage unit 61 is in a box shape with a substantially rectangular cross section. It should be understood, however, that the storage unit 61 may be of any shape and size, and may include compartments for various articles of different sizes and shapes. The storage unit 61 is attached to an edge of the base 10 by a connection portion (not shown). The base 10 is formed as a continuous sheet, and is sized to slide under a mat of a vehicle trunk.

Figure 7:
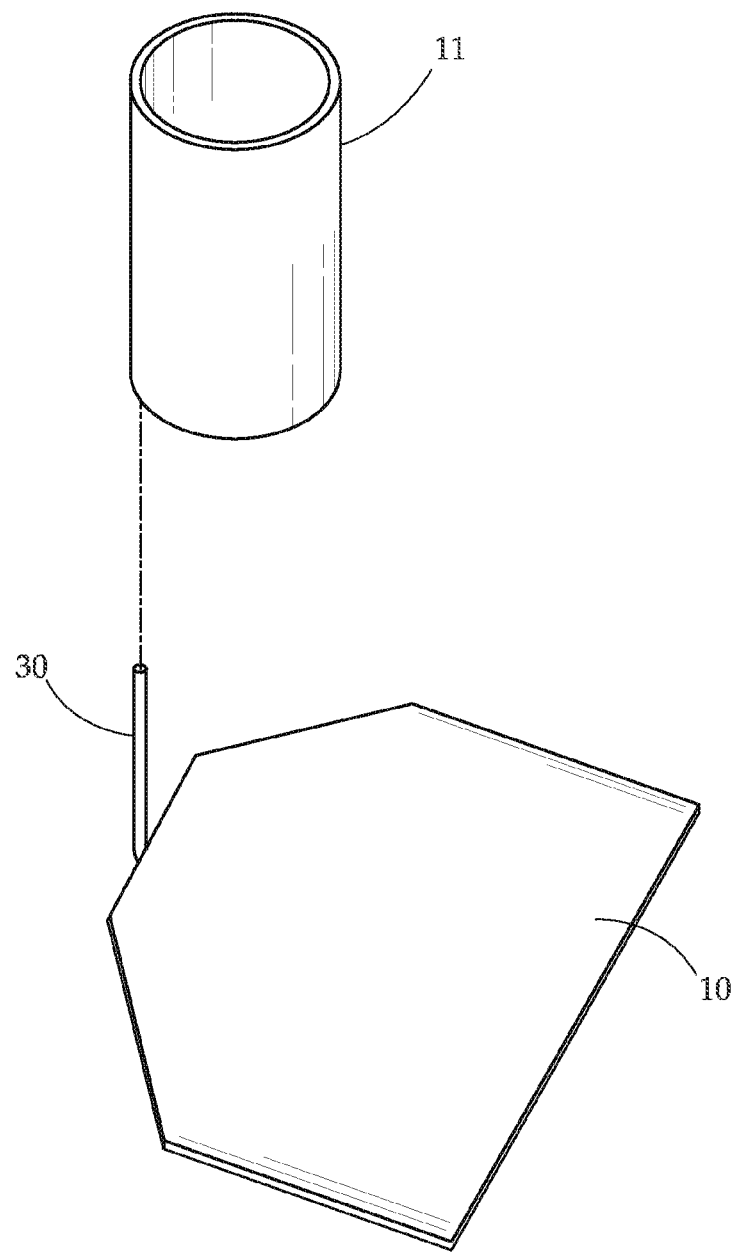
FIG. 7 provides a perspective view of another embodiment of the storage device.

FIG. 7 provides a perspective view of another embodiment of the storage device. The base 10 is substantially flat and fairly narrow. A connection portion 30 of the base extends upwards and connects to the storage unit 11. The connection portion 30 provides a spacing between the storage unit 11 and the base 10 through which a mat of a vehicle may pass. The storage unit 11 is shown as removable and is positioned above the base 11 and connectable to the base by the connection portion 30.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. An automotive vehicle comprising:
a passenger section and a trunk, the trunk being separate and isolated from the passenger section, a bottom of the trunk having a mat placed thereon;
a trunk storage device secured within the trunk, the trunk storage device constructed and arranged to secure an item within the trunk, the trunk storage device comprising:
a base positioned under the mat of the trunk;
a storage unit attached to the base by a connection portion, and positioned above the mat of the trunk;
wherein the base comprises a cross sectional footprint area greater than a cross sectional footprint area of the storage unit;
a windshield washer fluid container containing windshield washer fluid secured within the storage unit, the storage unit being sized to receive the windshield washer fluid container; and
wherein the connection portion forms a spacing between the storage unit and the base, the trunk mat being positioned in the spacing between the storage unit and the base.

2. The vehicle of claim 1 wherein the storage unit is permanently attached to the connection portion.

3. The vehicle of claim 1 wherein the storage unit is removably attached to the connection portion.

4. The vehicle of claim 1 wherein the cross sectional footprint area of the base is two times greater than the cross sectional footprint area of the storage unit.

5. The vehicle of claim 1 wherein the storage unit is substantially cylindrical.

6. The vehicle of claim 5 wherein the substantially cylindrical storage unit snugly surrounds the windshield washer fluid container.

7. An automotive vehicle comprising:
a passenger section and a trunk, the trunk being separate and isolated from the passenger section, a bottom of the trunk having a mat placed thereon;
a trunk storage device secured within the trunk, the trunk storage device constructed and arranged to secure an item within the trunk, the trunk storage device comprising:
a base positioned under the mat of the trunk;
a storage unit attached to the base by a connection portion, and positioned above the mat of the trunk;
wherein the base comprises a cross sectional footprint area greater than a cross sectional footprint area of the storage unit;
a gas tank containing gasoline secured within the storage unit, the storage unit being sized to receive the gas tank; and
wherein the connection portion forms a spacing between the storage unit and the base, the trunk mat being positioned in the spacing between the storage unit and the base.

8. The vehicle of claim 7 wherein the cross sectional footprint area of the base is two times greater than the cross sectional footprint area of the storage unit.

9. The vehicle of claim 7 wherein the storage unit has a substantially rectangular cross section.

10. The vehicle of claim 9 wherein the substantially cylindrical storage unit snugly surrounds the gas tank.

* * * * *